G. STEPHENSON.
Forceps for Snouting Hogs.
No. 143,730.  Patented Oct. 14, 1873.
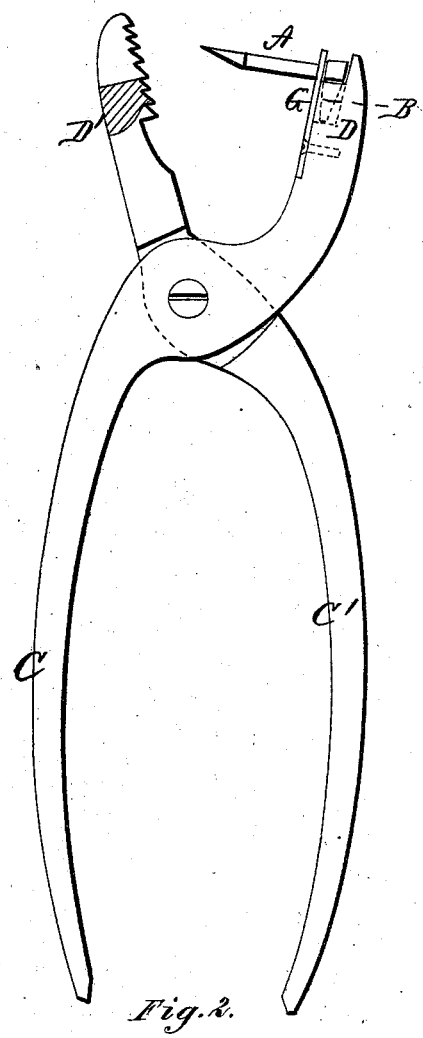
Witnesses
John A. Ellis
Frank L. Berley
Inventor
George Stephenson
Per
C. H. Watson &Co.
Att'y's

UNITED STATES PATENT OFFICE.

GEORGE STEPHENSON, OF ZIONSVILLE, INDIANA.

IMPROVEMENT IN FORCEPS FOR SNOUTING HOGS.

Specification forming part of Letters Patent No. 143,730, dated October 14, 1873; application filed August 6, 1873.

*To all whom it may concern:*

Be it known that I, GEORGE STEPHENSON, of Zionsville, in the county of Boone and State of Indiana, have invented certain new and useful Improvements in Forceps for Snouting Hogs; and I do hereby declare that the following is a full, clear, and exact description thereof, reference being had to the accompanying drawings and to the letters of reference marked thereon, which form a part of this specification.

The nature of my invention consists in the construction and arrangement of a spear for inserting in a hog's snout, and also in the construction of forceps for inserting the spear, all of which will be hereinafter more fully set forth.

In order to enable others skilled in the art to which my invention appertains to make and use the same, I will now proceed to describe its construction and operation, referring to the annexed drawing, in which—

Figure 1 is a side view, part in section, of my forceps; and Fig. 2 is a perspective view of the spear.

A represents an ordinary spear, of suitable size to be passed through a hog's snout. From the rear cross-bar of the snout A projects a point, B, which, when the spear is inserted into the rooter of the hog, projects forward and rests on the upper side of the rooter or snout, reaching as far forward as the rooter, and coming in contact with the earth should the hog attempt to root, and thereby prevents him from rooting. For inserting this spear, I use peculiarly-constructed forceps, of which C C' are the handles, and D D' the respective jaws formed on the ends of the handles. The inner side of the jaw D' is toothed or corrugated transversely, to enable the operator to hold the same steady on the snout and not slip; and the outer end of this jaw is forked, to allow the spear-head to pass through. The end of the jaw D has a shoulder or offset, upon which the cross-bar of the spear is to rest, and a recess, into which the point B fits. On the inner side of this jaw is attached a spring-plate, G, the outer end of which is forked, to embrace the shank of the spear, and thus hold the spear on the jaw in proper position to be inserted in the hog's snout. This spring allows of spears of different size being used, as it will give and accommodate itself to the size of the spear needed.

Having thus fully described my invention, what I claim as new, and desire to secure by Letters Patent, is—

The forceps having the corrugated and slotted jaw D' and the jaw D, recessed and provided with the spring-plate G, being forked, all constructed and arranged for operation as and for the purpose specified.

In testimony that I claim the foregoing as my own I affix my signature in presence of two witnesses.

GEORGE STEPHENSON.

Witnesses:
B. M. GREGORY,
JOHN W. TULL.